United States Patent
Mabuchi

(10) Patent No.: US 7,768,556 B2
(45) Date of Patent: Aug. 3, 2010

(54) PHYSICAL QUANTITY DETECTION SYSTEM, METHOD FOR DRIVING PHYSICAL QUANTITY DETECTION SYSTEM, SOLID-STATE IMAGE PICKUP DEVICE, METHOD FOR DRIVING SOLID-STATE IMAGE PICKUP DEVICE, AND IMAGE PICKUP APPARATUS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/833,675

(22) Filed: Aug. 3, 2007

(65) Prior Publication Data
US 2008/0043119 A1 Feb. 21, 2008

(30) Foreign Application Priority Data
Aug. 18, 2006 (JP) ............................. 2006-223046

(51) Int. Cl.
H04N 5/235 (2006.01)
H04N 5/335 (2006.01)
(52) U.S. Cl. .................................. 348/229.1; 348/297
(58) Field of Classification Search .............. 348/229.1, 348/297
See application file for complete search history.

(56) References Cited

U.S. PATENT DOCUMENTS 6,330,030 B1 * 12/2001 O'Connor .................... 348/297
6,369,737 B1 * 4/2002 Yang et al. ................... 341/155
6,927,793 B1 * 8/2005 Seitz et al. ................ 348/230.1
6,975,355 B1 * 12/2005 Yang et al. ................... 348/308
7,477,305 B2 * 1/2009 Kondo et al. ................. 348/297

FOREIGN PATENT DOCUMENTS

| JP | 05-316413 | 11/1993 |
| JP | 09-009154 | 1/1997 |
| JP | 2001-285721 | 10/2001 |
| JP | 2004-304256 | 10/2004 |
| JP | 2006-191536 | 7/2006 |

OTHER PUBLICATIONS

Orly Yadid-Pecht and Eric R. Fossum; Wide Intrascene Dynamic Range CMOS APS Using Dual Sampling; IEEE Transactions on Electron Devices, vol. 44, No. 10; pp. 1721.
Japanese Office Action dated Sep. 2, 2008 for Application No. 2006-223046.

\* cited by examiner

*Primary Examiner*—David L Ometz
*Assistant Examiner*—Dillon Durnford-Geszvain
(74) *Attorney, Agent, or Firm*—Sonnenschein Nath & Rosenthal LLP

(57) ABSTRACT

A physical quantity detection system includes a pixel array unit including pixels two-dimensionally arranged in a matrix, where each of the pixel converts an externally supplied physical quantity into an electrical signal, a readout unit configured to read out a signal from each of the pixels n times by changing the sensitivity each time, where n is an integer greater than or equal to 2, a storage unit configured to store m signals out of the n signals read out from the pixel, where m is an integer greater than or equal to 1 and is less than n, and a write control unit configured to compare the signal read out from the pixel by the readout unit with a predetermined threshold value and configured to control a write operation of the signal into the storage unit on the basis of the comparison result.

12 Claims, 7 Drawing Sheets

FIG. 3A

| | ACCUMULATION TIME RATIO |
|---|---|
| FIRST SCAN | 64 |
| SECOND SCAN | 16 |
| THIRD SCAN | 4 |
| FOURTH SCAN | 1 |

FIG. 3B

| | ACCUMULATION TIME RATIO |
|---|---|
| FIRST SCAN | 1 |
| SECOND SCAN | 4 |
| THIRD SCAN | 16 |
| FOURTH SCAN | 64 |

PHYSICAL QUANTITY DETECTION SYSTEM, METHOD FOR DRIVING PHYSICAL QUANTITY DETECTION SYSTEM, SOLID-STATE IMAGE PICKUP DEVICE, METHOD FOR DRIVING SOLID-STATE IMAGE PICKUP DEVICE, AND IMAGE PICKUP APPARATUS

CROSS REFERENCES TO RELATED APPLICATIONS

The present invention contains subject matter related to Japanese Patent Application JP 2006-223046 filed in the Japanese Patent Office on Aug. 18, 2006, the entire contents of which are incorporated herein by reference.

BACKGROUND OF THE INVENTION

1. Field of the Invention

The present invention relates to a physical quantity detection system for detecting an externally input physical quantity, a method for driving the physical quantity detection system, a solid-state image pickup device for detecting an amount of externally input light as a physical quantity, a method for driving the solid-state image pickup device, and an image pickup apparatus using the solid-state image pickup device.

2. Description of the Related Art

To detect an externally input physical quantity, physical quantity detection systems are used. For example, to detect an amount of incident light from a subject as a physical quantity, a solid-state image pickup device has been developed. In addition, to detect the capacitance formed between a detection electrode and a finger in accordance with the irregularities of a fingerprint of the finger as physical quantities, a fingerprint detection device (a capacitance detection device) has been developed.

Among various physical quantity detection systems, some solid-state image pickup devices, for example, include a pixel array unit in which pixels each including a photoelectric transducer are two-dimensionally arranged in a matrix. By scanning each of the pixels twice by changing the accumulation time period (exposure time period) of the signal, the solid-state image pickup devices read out two signals from each of the pixels using different sensitivities. Thereafter, the solid-state image pickup devices combines the two signals so as to increase the dynamic range (refer to, for example, Orly Yadid-Pecht and Eric R. Fossum, "Wide Intrascene Dynamic Range CMOS APS Using Dual Sampling," IEEE TRANSACTIONS ON ELECTRON DEVICES, Vol. 44, No. 10, pp. 1721-1723, October 1997).

SUMMARY OF THE INVENTION

However, to further increase the dynamic range, it is desirable that three or more signals obtained by changing the sensitivity are combined instead of the above-described combination of two signals obtained by changing the sensitivity. In order to read out signals from a pixel of the pixel array unit by scanning a plurality of times and combine the signals into an image, the signals obtained by changing the sensitivity need to be stored in a memory. Therefore, as the number of signals used in the combining process for generating an image having an increased dynamic range increases, the required capacity of the memory increases. In addition, the required image combining time and the required power consumption disadvantageously increase.

Accordingly, the present invention provides a physical quantity detection system, a method for driving the physical quantity detection system, a solid-state image pickup device, a method for driving the solid-state image pickup device, and an image pickup apparatus capable of increasing the dynamic range using a low-capacity storage unit.

According to an embodiment of the present invention, a physical quantity detection system includes a pixel array unit including pixels two-dimensionally arranged in a matrix, each of the pixels converting an externally supplied physical quantity into an electrical signal, readout means for reading out a signal from each of the pixels n times, changing the sensitivity each time, where n is an integer greater than or equal to 2, storage means for storing m signals out of the n signals read out from the pixel, where m is an integer greater than or equal to 1 and less than n, and write control means for comparing the signal read out from the pixel by the readout means with a predetermined threshold value and controlling a write operation of the signal into the storage means on the basis of the comparison result.

The physical quantity detection system reads out a signal from each of the pixels n times while changing the sensitivity each time so as to obtain n signals having different sensitivities from each pixel. In addition, the values of the signals read out from the pixels of the pixel array unit are compared with a predetermined threshold value. On the basis of the comparison results, it is determined whether the signal values are written to the storage means or the signals are discarded. In this way, the writing of the signals to the storage means is controlled.

According to the embodiment of the present invention, the value of a signal read out from a pixel of a pixel array unit using readout means is compared with a threshold value. By controlling writing of the signal to storage means on the basis of the comparison result, m signals that can be effectively used for increasing the dynamic range out of n signals obtained through n readout operations can be stored in the storage means. Accordingly, even when low-capacity storage means is used, the dynamic range can be increased.

BRIEF DESCRIPTION OF THE DRAWINGS

FIGS. 3A and 3B illustrate a relationship between the order of scanning and an accumulation time ratio;

DESCRIPTION OF THE PREFERRED EMBODIMENTS

Exemplary embodiments of the present invention are described with reference to the accompanying drawings.

In the following exemplary embodiments, as a physical quantity detection system for detecting an externally input physical quantity, for example, a solid-state image pickup device for detecting the intensity of incident light from a subject is employed. In addition, in these exemplary embodiments, a complementary metal oxide semiconductor (CMOS) image sensor is employed as a solid-state image pickup device.

First Exemplary Embodiment

Figure 1:
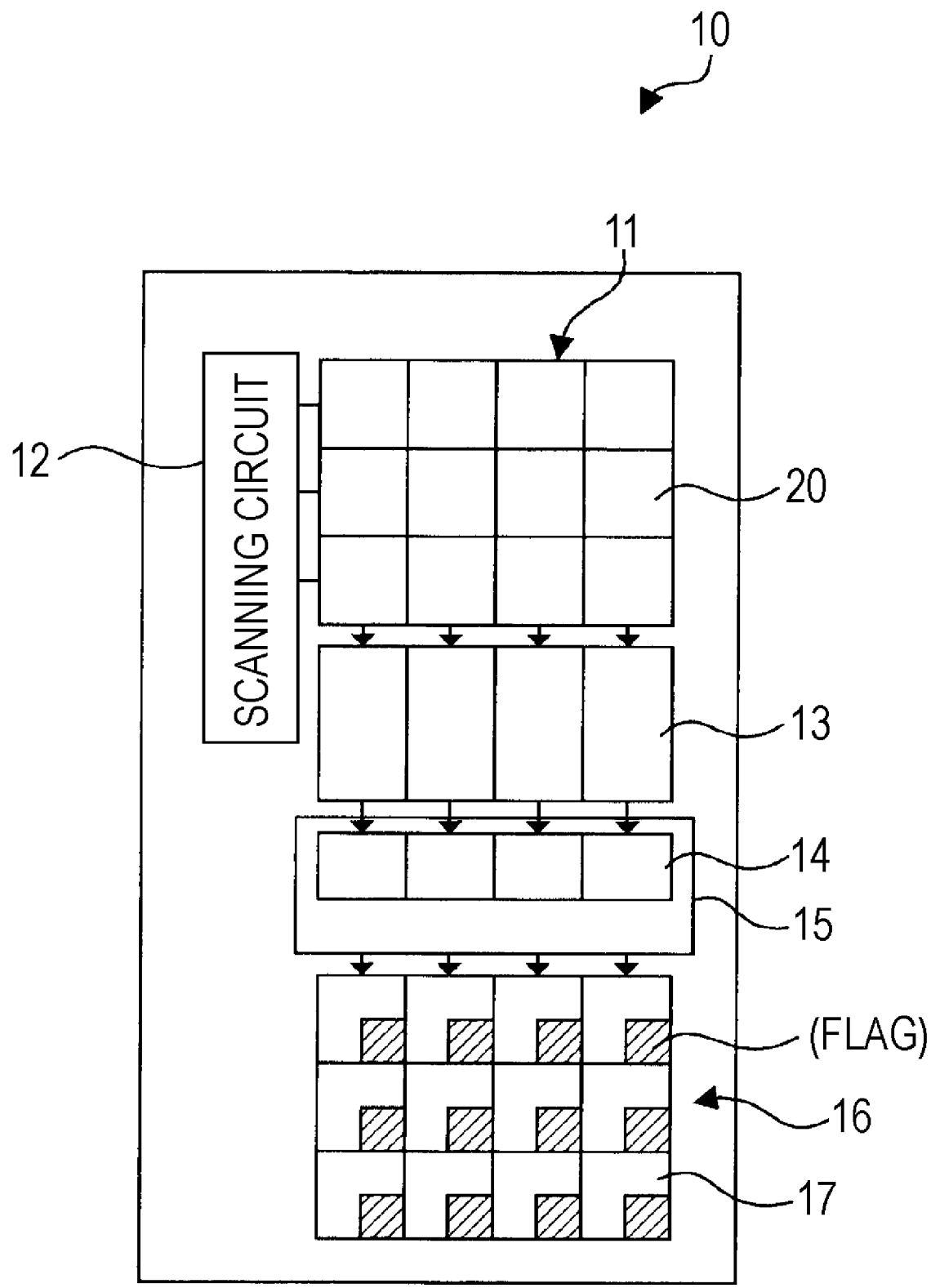
FIG. 1 is a block diagram of an exemplary system configuration of a solid-state image pickup device according to a first exemplary embodiment of the present invention.

FIG. 1 is a block diagram of an example of the system configuration of a solid-state image pickup device according to a first exemplary embodiment of the present invention. As shown in FIG. 1, a solid-state image pickup device 10 includes a pixel array unit 11, a scanning circuit 12, column circuits 13, and a write control circuit 15 including determination circuits 14, and a memory circuit 16.

The pixel array unit 11 includes a plurality of pixels 20 two-dimensionally arranged in a matrix. Each of the pixels 20 includes a photoelectric transducer that photoelectrically converts incident light into electric charge (an electric signal) in accordance with the amount of the incident light (i.e., an external physical quantity).

The scanning circuit 12 includes, for example, a shift register or a decoder. The scanning circuit 12 sequentially and selectively scans the pixels 20 of the pixel array unit 11 on a row-to-row basis in a vertical direction. Thereafter, the scanning circuit 12 supplies driving pulses (control pulses) to the pixels 20 in the selected row via pixel driving wires (not shown) so as to activate pixels 20 in the selected row simultaneously. Thus, the signals (analog signals) are read out from the pixels 20 in the selected row.

The signals read out from the pixels 20 in the selected row are supplied to the column circuits 13 disposed in parallel so as to correspond to columns of the pixels 20. Each of the column circuits 13 processes a signal read out from the corresponding pixel 20 in the selected row and holds the signal. More specifically, each of the column circuits 13 is disposed immediately beneath the corresponding column of the pixels 20 of the pixel array unit 11. That is, there is a one-to-one correspondence between the column circuits 13 and the columns of the pixels 20. The column circuits 13 receive the signals read out from the pixels 20 in the selected row so as to perform signal processing on the signals. Examples of the signal processing include a correlated double sampling (CDS) process for removing fixed pattern noise unique for the pixels, an amplifying process, an analog-to-digital (A/D) conversion process, a black-level clamp process, and a vertical streaking correction process. Subsequently, the column circuits 13 hold the signals read out from the pixels 20 in the selected row.

Figure 2:
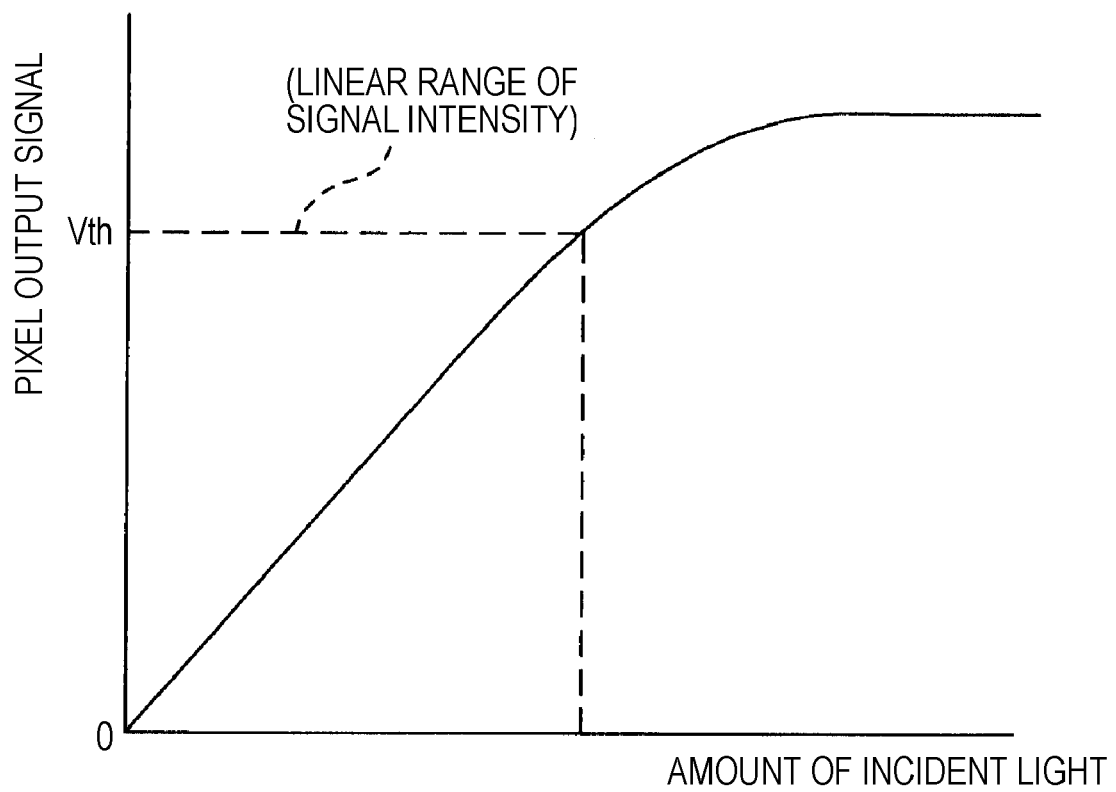
FIG. 2 illustrates a relationship between a pixel output signal and an amount of incident light.

Each of the determination circuits 14 compares the value of the signal read out from one of the pixels 20 by the scanning circuit 12 and held by one of the column circuits 13 with a predetermined threshold value. The predetermined threshold value is determined in accordance with the output signal characteristic of a pixel with respect to an amount of incident light. For example, when the output signal characteristic of a pixel has the characteristic shown in FIG. 2, a threshold value Vth is determined to be the maximum value of a pixel output signal in the linear range in which an amount of incident light is proportional to the value of a pixel output signal. The write control circuit 15 writes signals to the memory circuit 16 on the basis of the comparison results of the determination circuits 14. More specifically, the write control circuit 15 includes a sense amplifier circuit (not shown) that writes signals to the memory circuit 16 and controls the signal write operation performed by the sense amplifier circuit on the basis of the comparison results of the determination circuits 14.

The memory circuit 16 includes memory areas for one screen (one frame). There is a one-to-one correspondence between the memory areas and the pixels of the pixel array unit 11. For example, when the pixel array unit 11 has i rows and j columns of the pixels 20 arranged two-dimensionally, the memory circuit 16 has a memory region (a frame memory) having i×j memory cells 17 each corresponding to only one of the pixels 20. In addition, let each of the column circuits 13 hold a signal (hereinafter also referred to as a "pixel signal") read out from one of the pixels 20 of the pixel array unit 11 in the form of a 10-bit digital signal, for example. Then, each of the memory cells 17 corresponding to one pixel consists of a bit string field of length 10+3 (10 bits for the pixel signal and 3 bits for a flag, described below).

The procedure for reading out a pixel signal using a solid-state image pickup device having such a structure is described next. A method for reading out a pixel signal using the scanning circuit 12 is described first. The scanning circuit 12 reads out a signal from each of the pixels 20 in each row of the pixel array unit 11 four times by changing the sensitivity of the pixel. To read out a signal using the scanning circuit 12, the following two readout (scanning) methods can be employed.

In a first readout method, when the scanning circuit 12 scans the pixels 20 two-dimensionally arranged in the pixel array unit 11 on a row-to-row basis, two types of rows of pixels are provided: a row of pixels (hereinafter referred to as a "shutter row") used for performing electronic shutter scanning in order to discard signal charge accumulated in photoelectric transducers of the pixels and a row of pixels (hereinafter referred to as a "readout row") used for performing readout scanning in order to read out the signal charge accumulated in the photoelectric transducers of the pixels. The scanning circuit 12 performs the electronic shutter scanning and the readout scanning four times while sequentially changing the time periods (periods of exposure) of the shutter row and the readout row so as to read out a signal from each pixel four times.

In a second readout method, starting from a shutter row, four readout rows are determined by changing a scan-to-scan time interval between the rows. By scanning four readout rows in one scan period, a signal is read out from each pixel four times. In this method, the time of exposure of a pixel whose signal is read out when the first readout row is scanned depends on the interval between the shutter row and the first readout row. In addition, the time of exposure of a pixel whose signal is read out when the second readout row is scanned depends on the interval between the first readout row and the second readout row. Furthermore, the time of exposure of a pixel whose signal is read out when the third readout row is scanned depends on the interval between the second readout row and the third readout row. The time of exposure of a pixel whose signal is read out when the fourth readout row is scanned depends on the interval between the third readout row and the fourth readout row.

At that time, every time the readout count is incremented up to four, the scanning circuit 12 changes the sensitivity from high to low and scans the pixels in each row. In this way, the scanning circuit 12 reads out four signals (signals based on different sensitivities) from each pixel. Each pixel outputs a signal based on a different sensitivity depending on the accumulation time of the pixel. That is, when the accumulation time is relatively long, the pixel outputs a high-sensitivity signal. In contrast, when the accumulation time is relatively short, the pixel outputs a low-sensitivity signal.

To achieve this operation, the scanning circuit 12, as shown in FIG. 3A, sets an accumulation time ratio between the accumulation times of the signal to "64" for the first readout of the signal during the first scan operation. In addition, the scanning circuit 12 sets the accumulation time ratio to "16" for the second readout of the signal during the second scan operation. This accumulation time ratio is one fourth of the accumulation time ratio for the first readout of the signal. Furthermore, the scanning circuit 12 sets the accumulation time ratio to "4" for the third readout of the signal during the third scan operation. This accumulation time ratio is one fourth of the accumulation time ratio for the second readout of the signal. Still furthermore, the scanning circuit 12 sets the accumulation time ratio to "1" for the fourth readout of the signal during the fourth scan operation. This accumulation time ratio is one fourth of the accumulation time ratio for the third readout of the signal. In this way, the scanning circuit 12 scans each of the pixels 20 four times by changing the accumulation time from a long to a short period each time.

Accordingly, the sensitivity of the pixel decreases (i.e., the output signal from the pixel decreases) as the scan count (readout count) increases from one to four. Therefore, in the preceding scan among the four scans, a dark portion of an image can be captured with a high sensitivity. As the scan count increases, a bright portion does not become saturated, and therefore, the output signal enters an optimum signal range. Consequently, by combining the signals acquired through the four scans, an image signal having a dynamic range sixty four times wider than that of the original image signal can be obtained.

The signal output from each of the pixels 20 is converted to, for example, a 10-bit digital signal by the column circuit 13. Each of the determination circuits 14 of the write control circuit 15 retrieves this digital signal. At that time, each of the determination circuits 14 determines whether the signal retrieved from the corresponding column circuit 13 is located in the linear range shown in FIG. 2 by, for example, determining whether the signal value is less than or equal to the threshold value Vth. A 10-bit digital signal ranges from 0 to 1023. Accordingly, for example, when the threshold value Vth is set to 850, each of the determination circuits 14 determines whether the signal from the pixel 20 in the corresponding column is less than or equal to 850 in each scan operation. The write control circuit 15 controls the memory circuit 16 in accordance with the determination result of the determination circuit 14 and the scan count as follows. Hereinafter, let "V1" denote a signal read out from a pixel in a first scan operation, "V2" denote a signal read out from the pixel in a second scan operation, "V3" denote a signal read out from the pixel in a third scan operation, and "V4" denote a signal read out from the pixel in a fourth scan operation.

In a first scan operation, if the signal V1 output from the pixel is less than or equal to 850, the value of the readout signal V1 is written into a bit string field for a pixel signal in the memory cell 17 (having 10+3 bits capacity) of the memory circuit 16 corresponding to that pixel. In addition, a flag "000" is written into a bit string field for a flag. However, if the signal V1 output from the pixel is greater than 850, the value of the readout signal V1 is not written into the bit string field for a pixel signal in the memory cell 17 of the memory circuit 16, thus discarding the signal V1. In addition, a flag "100" is written into the bit string field for a flag.

In a second scan operation, the first bit (the top bit) of the flag is read out from the memory cell 17 of the memory circuit 16 corresponding to the pixel from which a signal is to be read out. If the first bit is "0", the memory cell 17 stores the value of the signal V1 read out in the first scan operation. Accordingly, the value of the readout signal V2 is not overwritten, and the signal V2 is discarded. However, if the first bit of the flag is "1" and the value of the signal V2 is less than or equal to 850, the value of the readout signal V2 is written into a bit string field for a pixel signal in the memory cell 17 of the memory circuit 16 corresponding to that pixel. In addition, a flag "001", which is different from the flag written in the first scan operation, is written into the bit string field for a flag. At that time, if the previous data remains in the memory cells 17, the value of the signal V2 is overwritten. This operating manner applies to the following operations. If the first bit of the flag is "1" and the value of the signal V2 is greater than 850, the value of the readout signal V2 is not written into the bit string field for a pixel signal, and the signal V2 is discarded. In addition, the flag "100" written into the bit string field for a flag in the first scan operation remains unchanged.

In a third scan operation, the first bit (the top bit) of the flag is read out from the memory cell 17 of the memory circuit 16 corresponding to the pixel from which a signal is to be read out. If the first bit is "0", the memory cell 17 stores the value of the signal V1 read out in the first scan operation or the value of the signal V2 read out in the second scan operation. Accordingly, the value of the readout signal V3 is not overwritten, and the signal V3 is discarded. However, if the first bit of the flag is "1" and the value of the signal V3 is less than or equal to 850, the value of the readout signal V3 is written into a bit string field for a pixel signal in the memory cell 17 of the memory circuit 16 corresponding to that pixel. In addition, a flag "010", which is different from the flag written in the first or second scan operation, is written into the bit string field for a flag. If the first bit of the flag is "1" and the value of the signal V3 is greater than 850, the value of the readout signal V3 is not written into the bit string field for a pixel signal, and the signal V3 is discarded. Thus, the flag "100" written into the bit string field for a flag in the first scan operation remains unchanged.

In a fourth scan operation, the first bit (the top bit) of the flag is read out from the memory cell 17 of the memory circuit 16 corresponding to the pixel from which a signal is to be read out. If the first bit is "0", the memory cell 17 stores the value of the signal V1 read out in the first scan operation, the value of the signal V2 read out in the second scan operation, or the value of the signal V3 read out in the third scan operation. Accordingly, the value of the readout signal V4 is not overwritten, and the signal V4 is discarded. However, if the first bit of the flag is "1" and the value of the signal V4 is less than or equal to 850, the value of the readout signal V4 is written into a bit string field for a pixel signal in the memory cell 17 of the memory circuit 16 corresponding to that pixel. In addition, a flag "011", which is different from the flag written in the first, second, or third scan operation, is written into the bit string field for a flag. If the first bit of the flag is "1" and the value of the signal V4 is greater than 850, the value of the readout signal V4 is not written into the bit string field for a pixel signal, and the signal V4 is discarded. In addition, the flag "100" written into the bit string field for a flag in the first scan operation remains unchanged.

If the value of the signal V4 read out in the fourth scan operation is greater than 850, a 10-bit pixel signal is not written to the memory cell 17 corresponding to that pixel. In this case, the memory cell 17 contains the flag value "100", which is different from the flag value "000", "001", "010", or "011" written in the first to fourth scan operations. Accordingly, when the flag value "100" is written in the memory cell 17, a value of a signal that should be written in the memory cells 17 may indicate that the signal value is greater than 850 in the shortest exposure time setting (the exposure time ratio=1).

As described above, in the solid-state image pickup device according to the first exemplary embodiment of the present invention, every time the scanning circuit 12 performs a readout (scan) operation, the scanning circuit 12 changes the sensitivity from high to low and reads out a signal from one of the pixels 20 n times (n=4 in this exemplary embodiment). Thus, n signals are obtained from the pixel 20. The write control circuit 15 performs control so that the values of m (m=1 in this exemplary embodiment) signals out of the n signals obtained after the value of the readout signal becomes less than or equal to a threshold value are written to the memory circuit 16 and the signals read out after the m signal values are written to the memory circuit 16 are discarded.

That is, in a first scan operation, if the value of the signal V1 is less than or equal to the threshold value, the value of the signal V1 is written to the memory circuit 16. However, if the value of the signal V1 is greater than the threshold value, the signal V1 is discarded. In a second scan operation, if the signal value has been already written during the first scan operation, the signal V2 read out in the second scan operation is discarded. However, if the signal value has not been yet written during the first scan operation and the value of the signal V2 read out during the second scan operation is less than or equal to the threshold value, the value of the signal V2 is written to the memory circuit 16. However, if the value of the signal V2 is greater than the threshold value, the signal V2 is discarded.

In a third scan operation, if the signal value has been already written during the first or second scan operation, the signal V3 read out during the third scan operation is discarded. However, if the signal value has not been yet written during the first or second scan operation and the value of the signal V3 read out during the third scan operation is less than or equal to the threshold value, the value of the signal V3 is written to the memory circuit 16. However, if the value of the signal V3 is greater than the threshold value, the signal V3 is discarded. In a fourth scan operation, if the signal value has been already written during the first, second, or third scan operation, the signal V4 read out during the fourth scan operation is discarded. However, if the signal value has not been yet written during the first, second, or third scan operation and the value of the signal V4 read out during the fourth scan operation is less than or equal to the threshold value, the value of the signal V4 is written to the memory circuit 16. However, if the value of the signal V4 is greater than the threshold value, the signal V4 is discarded.

That is, even when the pixel signal is saturated during early scan operations in which the time of exposure is long, the pixel signal enters the linear range, in which the pixel signal is not saturated, during the later scan operations in which the time of exposure is short. Accordingly, m (m=1 in this exemplary embodiment) signal values obtained after the pixel signal enters the linear range are written to the memory cell 17 of the memory circuit 16 together with flag information (identification information) that indicates in which scan operation the signal value is read out. Thereafter, no signal values are written. In this way, pixel signals can be read out from each of the pixels 20 of the pixel array unit 11 through four scan operations performed by the scanning circuit 12 and can be stored in the memory circuit 16 having a memory region for one screen (one frame).

In addition, only pixel signals having a signal value less than or equal to a threshold value (850 in this exemplary embodiment) are written to the memory circuit 16 through the first to fourth scan operations. Accordingly, of four signals (i.e., V1, V2, V3, and V4) read out from one of the pixel 20 through the four scan operations, only one signal that can be effectively used in a combining process can be stored in the memory circuit 16. Note that the combining process is performed by a downstream signal processing circuit (e.g., a DSP circuit) in order to acquire an image having an increased dynamic range.

Furthermore, in the memory cell 17 of the memory circuit 16, the signal value with a flag "000" represents a signal value read out during the first scan operation. The signal value with a flag "001" represents a signal value read out during the second scan operation. The signal value with a flag "010" represents a signal value read out during the third scan operation. The signal value with a flag "011" represents a signal value read out during the fourth scan operation.

Accordingly, by reading out the signal value and the flag from each of the memory cells 17 of the memory circuit 16, the downstream signal processing circuit (e.g., a DSP circuit) can determine in which scan operation the signal value has been acquired. Thereafter, the signal processing circuit can perform a combining process to generate an image having an increased dynamic range by using the determination result. In such a method, signal processing for increasing the dynamic range can be performed more accurately than in a method for summing and averaging signals obtained by reading out signal value of a pixel a plurality of times and writing the result into a frame memory. This is because this method uses only a signal acquired during a readout operation under excellent image capturing conditions and the method can determine which readout operation has provided the signal for each pixel. For example, when an image of a moving object is captured, the signal processing circuit can increase the dynamic range of the image while referring to the additional information indicating in which exposure time period the signal is acquired. Therefore, the flexibility and the reliability of the image combining process can be increased. Note that this advantage can be similarly provided by the following exemplary embodiments.

In the above-described readout operation, as shown in FIG. 3A, each of the pixels 20 is scanned four times by changing the exposure time ratio from high to low (i.e., from 64 to 16, to 4, and to 1) each time. However, as shown in FIG. 3B, when each of the pixels 20 is scanned four times by changing the exposure time ratio from low to high (i.e., from 1 to 4, to 16, and to 64) each time, the signal readout operation can be performed as follows.

In a first scan operation, if the value of a signal output from a pixel is less than or equal to 850, the value of a readout signal V1 is written into a bit string field for a pixel signal in the memory cell 17 of the memory circuit 16, the memory cell 17 having a (10+3)-bit string field and corresponding to that pixel. In addition, a flag "000" is written into a bit string field for a flag. However, if the value of the signal V1 output from the pixel is greater than 850, the value of the signal V1 is not written into the bit string field for a pixel signal, and the signal V1 is discarded. At that time, a flag "100" is written into a bit string field for a flag.

In a second scan operation, the first bit (the top bit) of the flag is read out from the memory cell 17 of the memory circuit 16 corresponding to the pixel from which a signal is to be read out. If the first bit is "1", the value of the readout signal V2 is not overwritten, thus discarding the signal V2. However, if the first bit of the flag is "0" and the value of the signal V2 is less than or equal to 850, the value of the readout signal V2 is overwritten into a bit string field for a pixel signal in the memory cell 17 of the memory circuit 16 corresponding to that pixel. In addition, a flag "001" is written as the bit string for a flag. If the first bit of the flag is "0" and the value of the signal V2 is greater than 850, the value of the readout signal V2 is not overwritten into a bit string field for a pixel signal in the memory cell 17 of the memory circuit 16 corresponding to that pixel, and the signal V2 is discarded. In addition, the flag "000", which has been written to the bit string field for a flag in the first scan operation, remains unchanged.

In a third scan operation, the first bit (the top bit) of the flag is read out from the memory cell 17 of the memory circuit 16 corresponding to the pixel from which a signal is to be read out. If the first bit is "1", the value of the readout signal V3 is not overwritten, thus discarding the signal V3. However, if the first bit of the flag is "0" and the value of the signal V3 is less than or equal to 850, the value of the readout signal V3 is overwritten into a bit string field for a pixel signal in the memory cell 17 of the memory circuit 16 corresponding to that pixel. In addition, a flag "010" is written into the bit string field for a flag. If the first bit of the flag is "0" and the value of the signal V3 is greater than 850, the value of the readout signal V3 is not overwritten into a bit string field for a pixel signal in the memory cell 17 of the memory circuit 16 corresponding to that pixel, and the signal V3 is discarded. In addition, the flag "000" or "001", which has been written into the bit string field for the flag in the first or second scan operation, remains unchanged.

In a fourth scan operation, the first bit (the top bit) of the flag is read out from the memory cell 17 of the memory circuit 16 corresponding to the pixel from which a signal is to be read out. If the first bit is "1", the value of the readout signal V4 is not overwritten, thus discarding the signal V4. However, if the first bit of the flag is "0" and the value of the signal V4 is less than or equal to 850, the value of the readout signal V4 is overwritten into a bit string field for a pixel signal in the memory cell 17 of the memory circuit 16 corresponding to that pixel. In addition, a flag "011" is written into the bit string field for a flag. If the first bit of the flag is "0" and the value of the signal V4 is greater than 850, the value of the readout signal V4 is not overwritten into a bit string field for a pixel signal in the memory cell 17 of the memory circuit 16 corresponding to that pixel, and the signal V4 is discarded. In addition, the flag "000", "001", or "010", which has been written into the bit string field for the flag in the first, second, or third scan operation, remains unchanged.

If the value of the signal V1 read out in the first scan operation is greater than 850, a 10-bit pixel signal is not written to the memory cell 17 corresponding to that pixel. In this case, the memory cell 17 contains the flag value "100", which is different from the flag value "000", "001", "010", or "011" written in the first to fourth scan operations. Accordingly, when the flag value "100" is written in the memory cell 17, a value of a signal that should be written in the memory cells 17 may indicate that the signal value is greater than 850 in the shortest exposure time setting (the exposure time ratio=1).

As described above, in the solid-state image pickup device according to the first embodiment of the present invention, every time the scanning circuit 12 performs a readout (scan) operation, the scanning circuit 12 changes the sensitivity from low to high and reads out a signal from one of the pixels 20 n times (n=4 in this embodiment). Thus, n signals are obtained from the pixel 20. The write control circuit 15 performs control so that the values of m (m=1 in this embodiment) signals out of the n signals obtained before the readout count reaches m are written to the memory circuit 16. Subsequently, if the value of the signal obtained before the readout count reaches n is less than or equal to the threshold value, the value of the signal is overwritten to the memory circuit 16. However, if the value of the signal obtained before the readout count reaches n is greater than the threshold value, the signal is discarded.

That is, in a first scan operation, if the value of the signal V1 is less than or equal to the threshold value, the value of the signal V1 is written to the memory circuit 16. However, if the value of the signal V1 is greater than the threshold value, the signal V1 is discarded. In a second scan operation, if the signal value of the signal V2 is less than or equal to the threshold value, the value of the signal V2 is overwritten to the memory circuit 16. However, if the value of the signal V1 is greater than the threshold value, the signal V1 is discarded. In a third scan operation, if the signal value of the signal V3 is less than or equal to the threshold value, the value of the signal V3 is overwritten to the memory circuit 16. However, if the value of the signal V3 is greater than the threshold value, the signal V3 is discarded. In a fourth scan operation, if the signal value of the signal V4 is less than or equal to the threshold value, the value of the signal V2 is overwritten to the memory circuit 16. However, if the value of the signal V4 is greater than the threshold value, the signal V4 is discarded.

In this way, pixel signals read out from each of the pixels 20 of the pixel array unit 11 through four scan operations performed by the scanning circuit 12 can be stored in the memory circuit 16 having a memory region for one screen (one frame). In addition, only pixel signals having a signal value less than or equal to a threshold value (850 in this embodiment) are written to the memory circuit 16 in the first to fourth scan operations. Accordingly, among four signals (i.e., V1, V2, V3, and V4) read out from one of the pixel 20 through four scan operations, only one signal that can be effectively used in a combining process can be stored in the memory circuit 16. Note that the combining process is performed by a downstream signal processing circuit (e.g., a DSP circuit) in order to acquire an image having an increased dynamic range.

Furthermore, in the memory cell 17 of the memory circuit 16, the signal value with a flag "000" represents a signal value read out during the first scan operation. The signal value with a flag "001" represents a signal value read out during the second scan operation. The signal value with a flag "010" represents a signal value read out during the third scan operation. The signal value with a flag "011" represents a signal value read out during the fourth scan operation.

Accordingly, by reading out the signal value and the flag from each of the memory cells 17 of the memory circuit 16, the downstream signal processing circuit (e.g., a DSP circuit) can determines which scan operation has acquired the signal value. Thereafter, the signal processing circuit can combine an image having an increased dynamic range by using the determination result. Such a method can perform signal processing for increasing the dynamic range more accurately than the existing method. Therefore, the flexibility and the reliability of the image combining process can be increased.

Second Exemplary Embodiment

Figure 4:
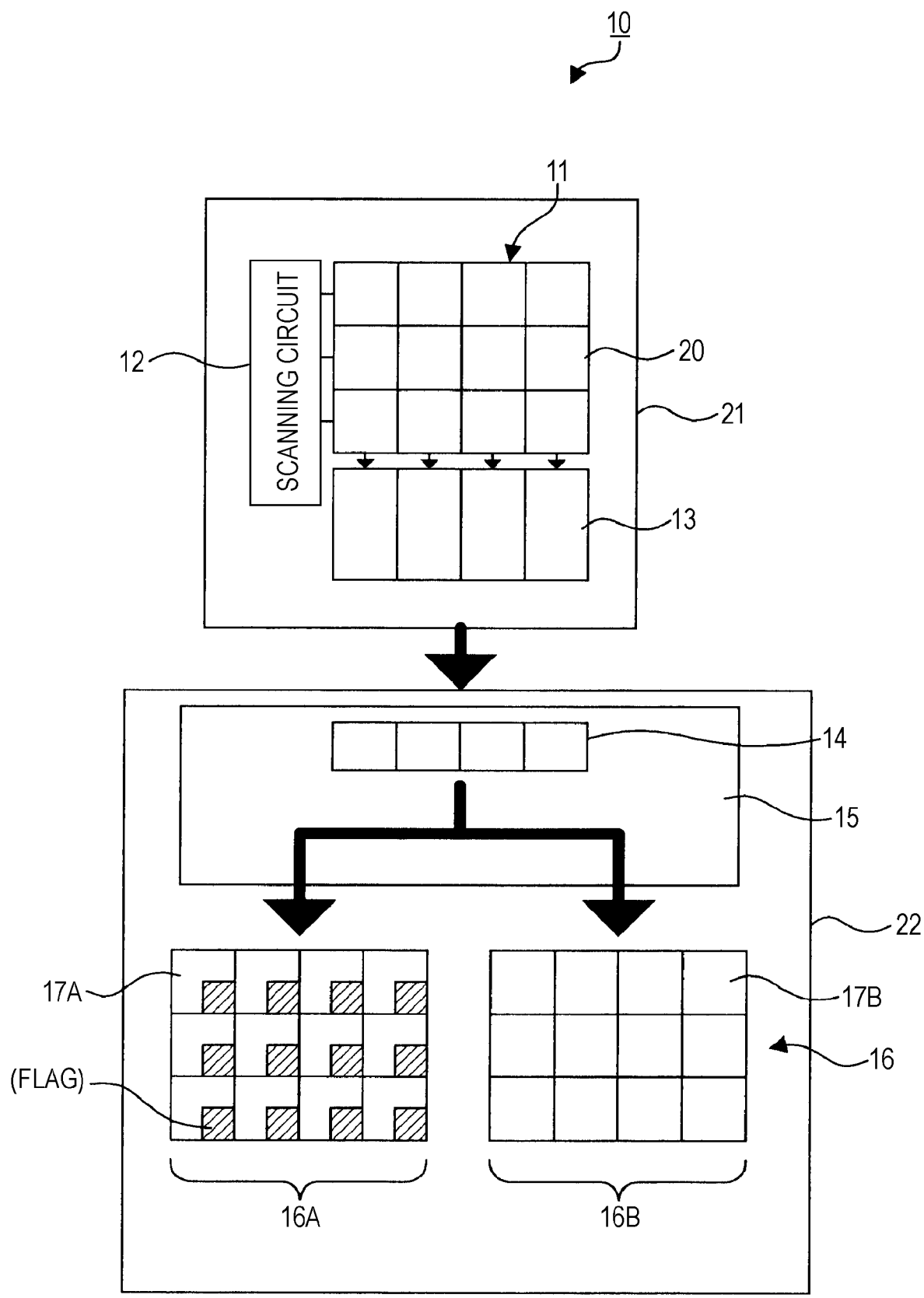
FIG. 4 is a block diagram of an exemplary system configuration of a solid-state image pickup device according to a second exemplary embodiment of the present invention.

FIG. 4 is a block diagram of an example of the system configuration of a solid-state image pickup device according to a second exemplary embodiment of the present invention. As shown in FIG. 4, a solid-state image pickup device 10 includes a pixel array unit 11, a scanning circuit 12, column circuits 13, and a write control circuit 15 including determination circuits 14, and a memory circuit 16. The pixel array unit 11, the scanning circuit 12, and the column circuits 13 are formed on a first semiconductor substrate (chip) 21. While, the write control circuit 15 and the memory circuit 16 are formed on a second semiconductor substrate (chip) 22 that is different from a first semiconductor substrate (chip) 21.

The reason why the system configuration having two different semiconductor substrates 21 and 22 is employed is because a high efficiency can be obtained if the pixel array unit 11 and the memory circuit 16 are produced in different manufacturing processes. Therefore, if a high efficiency is not needed, system components from the pixel array unit 11 to the memory circuit 16 may be formed on the same or common semiconductor substrate. In addition, in an electrical connection between the semiconductor substrates 21 and 22, after signals held by the column circuits 13 on the semiconductor substrate 21 are horizontally scanned, the signals may be transmitted to the components on the second semiconductor substrate 22. However, it is desirable that a column of pixels or several columns of pixels on the semiconductor substrate 21 is electrically connected to the corresponding column or columns on the second semiconductor substrate 22 using, for example, a microbump method in which electrical connection is achieved using microbumps.

The pixel array unit 11, the scanning circuit 12, and the column circuits 13 have similar functions as those of the first exemplary embodiment. The write control circuit 15 includes the determination circuits 14 having a function similar to that of the first embodiment. However, since the memory circuit 16 to which signals are written has two memory regions 16A and 16B for two screens (two frames), the write control circuit 15 writes the signals to one of the memory regions 16A and 16B at one time.

As noted above, the memory circuit 16 has two memory regions (memory frames) 16A and 16B. Like the memory circuit 16 of the first exemplary embodiment, the memory region 16A (hereinafter referred to as a "first memory region") includes memory cells 17A for one screen (one frame) so as to have, for example, a one-to-one correspondence with the pixels of the pixel array unit 11. Each of the memory cells 17A corresponding to one pixel contains a bit string field of length 10+3 (10 bits for the pixel signal and 3 bits for a flag). In contrast, the memory region 16B (hereinafter referred to as a "second memory region") includes memory cells 17B for one screen (one frame), as in the first memory region 16A. However, each of the memory cells 17B corresponding to one pixel only contains a bit string field of length 10 and does not contain a bit string field for a flag.

The procedure for reading out a pixel signal using a solid-state image pickup device having such a structure is described next. As shown in FIG. 3A, the scanning circuit 12 scans pixels in each row four times by changing the exposure time ratio from high to low (i.e., from 64 to 16, to 4, and to 1) each time. Thus, the scanning circuit 12 reads out four signals each having a different sensitivity from each pixel. The column circuits 13 and the determination circuits 14 operate in the same manner as the first embodiment. In this case, the write control circuit 15 controls the operation of writing a signal to the memory circuit 16 in accordance with the determination result of the determination circuits 14 and the scan count as follows.

In a first scan operation, if the signal V1 output from the pixel is less than or equal to 850, the value of the readout signal V1 is written into a bit string field for a pixel signal in the memory cell 17A (having 10+3 bit capacity) of the first memory region 16A corresponding to that pixel. In addition, a flag "000" is written into a bit string field for a flag. However, if the signal V1 output from the pixel is greater than 850, the value of the readout signal V1 is not written into the bit string field for a pixel signal in the memory cell 17A of the first memory region 16A, thus discarding the signal V1. In addition, a flag "100" is written into the bit string field for a flag.

In a second scan operation, the first bit (the top bit) of the flag is read out from the memory cell 17A of the first memory region 16A corresponding to the pixel from which a signal is to be read out. If the first bit is "0", the value of the signal V2 read out in the second scan operation is written into the memory cell 17B of the second memory region 16B corresponding to the pixel from which a signal is to be read out. However, if the first bit of the flag is "1" and the value of the signal V2 is less than or equal to 850, the value of the readout signal V2 is written into a bit string field for a pixel signal in the memory cell 17A of the first memory region 16A corresponding to that pixel. In addition, a flag "001" is written as the bit string for a flag. If the first bit of the flag is "1" and the value of the signal V2 is greater than 850, the readout signal V2 is discarded.

In a third scan operation, the flag is read out from the memory cell 17A of the first memory region 16A corresponding to the pixel from which a signal is to be read out. If the flag is "000", the signal V3 read out in the third scan operation is discarded. However, if the flag is "001", the value of the readout signal V3 is written into the memory cell 17B of the second memory region 16B corresponding to that pixel. In addition, if the first bit of the flag is "1" and the readout signal V3 is less than or equal to 850, the value of the readout signal V3 is written into the bit string field for a pixel signal in the memory cell 17A of the first memory region 16A corresponding to the pixel. In addition, the flag "010" is written into the bit string field for a flag. If the first bit of the flag is "1" and the readout signal V3 is greater than 850, the readout signal V3 is discarded.

In a fourth scan operation, the flag is read out from the memory cell 17A of the first memory region 16A corresponding to the pixel from which a signal is to be read out. If the flag is "000" or "001", the signal V4 read out in the fourth scan operation is discarded. However, if the flag is "010", the value of the readout signal V4 is written into the memory cell 17B of the second memory region 16B corresponding to that pixel. In addition, if the first bit of the flag is "1" and the readout signal V4 is less than or equal to 850, the value of the readout signal V4 is written into the bit string field for a pixel signal in the memory cell 17A of the first memory region 16A corresponding to the pixel. In addition, the flag "011" is written into the bit string field for a flag. If the first bit of the flag is "1" and the readout signal V4 is greater than 850, the readout signal V4 is discarded.

In this way, in the solid-state image pickup device according to the second exemplary embodiment of the present invention, every time the scanning circuit 12 performs a readout (scan) operation, the scanning circuit 12 changes the sensitivity from high to low and reads out a signal from the pixel 20 n times (n=4 in this exemplary embodiment). Thus, n signals are obtained from the pixel 20. The write control circuit 15 performs control so that m (m=1 in this exemplary embodiment) signals out of the n signals obtained after the value of the readout signal becomes less than or equal to a threshold value are written to the memory circuit 16 and the signals read out after the m signal values are written to the memory circuit 16 are discarded.

That is, in a first scan operation, if the value of the signal V1 is less than or equal to the threshold value, the value of the signal V1 is written to the first memory region 16A. However, if the value of the signal V1 is greater than the threshold value, the signal V1 is discarded. In a second scan operation, if the signal value has been already written to the first memory region 16A during the first scan operation, the value of the signal V2 read out in the second scan operation is written to the second memory region 16B. However, if the signal value has not been yet written during the first scan operation and the value of the signal V2 read out during the second scan operation is less than or equal to the threshold value, the value of the signal V2 is written to the first memory region 16A. However, if the value of the signal V2 is greater than the threshold value, the signal V2 is discarded.

In a third scan operation, if the signal values have been already written into the first memory region 16A and the second memory region 16B during the first and second scan operations, the signal V3 read out during the third scan operation is discarded. If the signal value has been already written into only the first memory region 16A during the second scan operation, the signal V3 read out during the third scan operation is written into the second memory region 16B. However, if the signal values have not been yet written during the first and second scan operations and the value of the signal V3 read out during the third scan operation is less than or equal to the threshold value, the value of the signal V3 is written into the first memory region 16A. However, if the value of the signal V3 is greater than the threshold value, the signal V3 is discarded.

In a fourth scan operation, if the signal values have been already written into the first memory region 16A and the second memory region 16B during the first to third scan operations, the signal V4 read out during the fourth scan operation is discarded. In addition, the signal value has been already written into the first memory region 16A during the third scan operation, the signal V4 read out during the third scan operation is written into the second memory region 16B. However, if the signal values have not been yet written during the first to third scan operations and the value of the signal V4 read out during the fourth scan operation is less than or equal to the threshold value, the value of the signal V4 is written into the first memory region 16A. However, if the value of the signal V4 is greater than the threshold value, the signal V4 is discarded.

That is, even when the pixel signal is saturated during early scan operations in which the time of exposure is long, the pixel signal enters the linear range, in which the pixel signal is not saturated, during the later scan operations in which the time of exposure is short. Accordingly, m (m=2 in this exemplary embodiment) signal values obtained after the pixel signal enters the linear range are written to the memory cell 17 of the memory circuit 16 together with flag information (identification information) that indicates in which scan operation the signal value is read out. Thereafter, no signal values are written. In this way, pixel signals are read out from each of the pixels 20 of the pixel array unit 11 through four scan operations performed by the scanning circuit 12. Thereafter the pixel signals can be stored in the memory circuit 16 having the first memory region 16A and the second memory region 16B (memory cells 17A and 17B) for two screens (one frame).

In addition, only pixel signals having a signal value less than or equal to a threshold value (850 in this exemplary embodiment) are written to the memory circuit 16 in the first to fourth scan operations. Accordingly, of four signals (i.e., V1, V2, V3, and V4) read out from one of the pixel 20 through the four scan operations, only one signal that can be effectively used in a combining process can be stored in the memory circuit 16. Note that the combining process is performed by a downstream signal processing circuit (e.g., a DSP circuit) in order to acquire an image having an increased dynamic range.

Furthermore, in the memory cell 17A of the first memory region 16A, the signal value with a flag "000" represents a signal value read out during the first scan operation. The signal value with a flag "001" represents a signal value read out during the second scan operation. The signal value with a flag "010" represents a signal value read out during the third scan operation. The signal value with a flag "011" represents a signal value read out during the fourth scan operation. In contrast, in the memory cell 17B of the second memory region 16B, the signal value corresponding to the memory cell 17A including a flag "000" represents a signal value read out during the second scan operation. The signal value corresponding to the memory cell 17A including a flag "001" represents a signal value read out during the third scan operation. The signal value corresponding to the memory cell 17A including a flag "010" represents a signal value read out during the fourth scan operation.

Accordingly, by reading out the signal value and the flag from each of the memory cells 17A of the first memory region 16A and reading out the signal value from the memory cell 17B of the second memory region 16B corresponding to the memory cell 17A, the downstream signal processing circuit (e.g., a DSP circuit) can determine in which scan operation the signal value has been acquired. Thereafter, the signal processing circuit can perform an image combining process to generate an image having an increased dynamic range by using the determination result. Therefore, the flexibility and the reliability of the image combining process can be increased.

Theoretically, since the scanning circuit 12 performs scan operations by decreasing the time of exposure to one fourth of the original time each time, the scanning circuit 12 can select signal values that are located in the linear range and that are greater than one fourth of the threshold value from among signal values obtained by scanning a plurality of times while changing the time of exposure (i.e., the sensitivity). However, in practice, if, in some scan operation, an obtained signal value is close to a maximum value in the linear range and, in the next scan operation, the obtained signal value is about one fourth of the previous signal value, it is difficult to determine which signal value is selected to be written in the memory. In addition, even in the linear range, it is difficult to obtain an ideal linearity of the signal (the linearity of a signal output with respect to an amount of input light). Accordingly, even when the time of exposure is exactly one fourth of the previous time, the signal value is not exactly one fourth of the previous value. Therefore, when, for example, an image of a subject that has the gradation of the luminance, such as the sky, is captured, strip-shaped noise may occur in the transfer area of the signals.

In contrast, according to the second exemplary embodiment of the present invention, image data for two memory regions (two screens) are written to the memory circuit 16. Accordingly, when a signal is transferred to a signal having a different accumulation time, two signals that indicate the level of the overlap between two images (the difference between the signal values) can be used as an "overlap width". Accordingly, by transferring signals while referring to the overlap width, the downstream signal processing circuit (e.g., a DSP circuit) can prevent the occurrence of the above-described noise. Since only two important frames among frames obtained through a plurality of scan operations are stored, the capacity of the memory can be saved with little loss of important information. In addition, the downstream signal processing circuit can perform processing in a short time and at reduced consumption power. Furthermore, the size and the cost of he downstream signal processing circuit can be advantageously reduced.

In this exemplary embodiment, a plurality of scan operations are performed by decreasing the time of exposure in each scan operation. The second memory region 16B of the memory circuit 16 stores a signal read out after a signal read out previously is written to the first memory region 16A. In such a case, for the four scan operations, memory regions for three screens (three frames) may be provided. However, in a typical case, the memory regions for two screens are sufficient. In addition, in order to reduce the amount of image data stored in the memory circuit 16, it is desirable to provide the memory regions only for two screens.

Third Exemplary Embodiment

Figure 5:
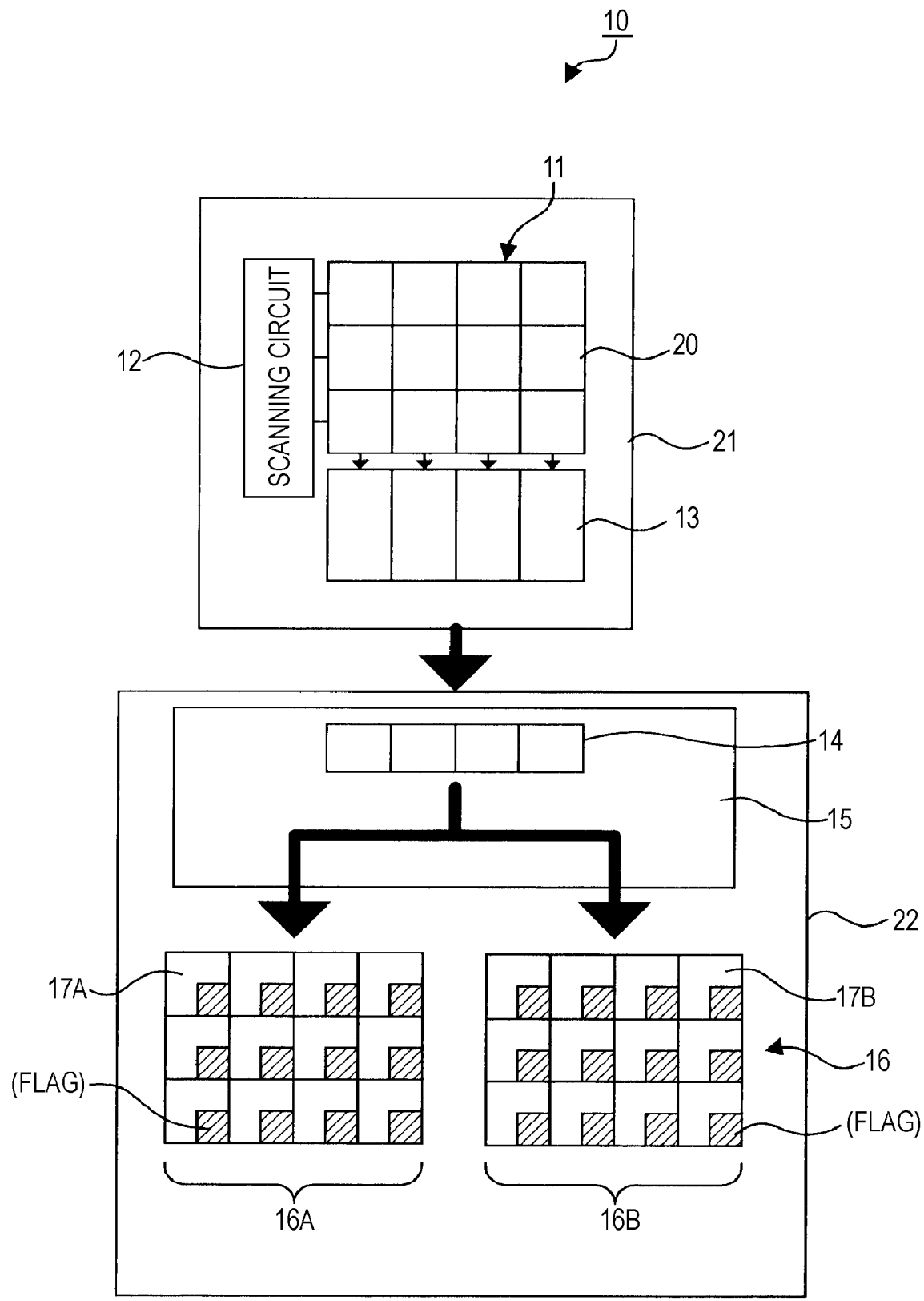
FIG. 5 is a block diagram of an exemplary system configuration of a solid-state image pickup device according to a third exemplary embodiment of the present invention.

FIG. 5 is a block diagram of an example of the system configuration of a solid-state image pickup device according to a third exemplary embodiment of the present invention. Like the second exemplary embodiment, as shown in FIG. 5, a solid-state image pickup device 10 includes a pixel array unit 11, a scanning circuit 12, column circuits 13, and a write control circuit 15 including determination circuits 14, and a memory circuit 16.

The memory circuit 16 has two memory regions (frame memories) 16A and 16B. Like the second exemplary embodiment, the memory region 16A includes memory cells 17A for one screen (one frame). Similarly, the memory region 16B includes memory cells 17B for one screen (one frame). Unlike the second exemplary embodiment, in the first memory region 16A, each of the memory cells 17A corresponding to one pixel contains a bit string field of length 10+1 (10 bits for the pixel signal and 1 bit for a flag). In the second memory region 16B, each of the memory cells 17B corresponding to one pixel only contains a bit string field of length 10+1 (10 bits for the pixel signal and 1 bit for a flag).

The procedure for reading out a pixel signal using a solid-state image pickup device having such a structure is described next. As shown in FIG. 3B, the scanning circuit 12 scans pixels in each row four times by changing the exposure time ratio from low to high (i.e., from 1 to 4, to 16, and to 64) each time, that is, by changing the sensitivity from low to high each time. Thus, the scanning circuit 12 reads out four signals each having a different sensitivity from each pixel. The column circuits 13 and the determination circuits 14 operate in the same manner as the first embodiment. In this case, the write control circuit 15 controls the operation of writing a signal to the memory circuit 16 in accordance with the determination result of the determination circuits 14 and the scan count as follows.

In a first scan operation, regardless of the value of a signal V1 read out from a pixel in the first scan operation, the value of the readout signal V1 is written into a bit string field for a pixel signal in the memory cell 17A (having 10+1 bit capacity) of the first memory region 16A corresponding to that pixel. In addition, a flag "0" is written into a bit string field for a flag.

In a second scan operation, regardless of the value of a signal V2 read out from a pixel in the second scan operation, the value of the readout signal V2 is written into a bit string field for a pixel signal in the memory cell 17B (having 10+1 bit capacity) of the second memory region 16B corresponding to that pixel. In addition, a flag "0" is written into a bit string field for a flag.

In a third scan operation, if the value of a signal V3 read out from the pixel in the third scan operation is less than or equal to 850, the value of the signal V3 is overwritten to the bit string field for a pixel signal in the memory cell 17A of the first memory region 16A corresponding to the pixel. In addition, a flag "1" is overwritten to the bit string field for a flag. If the value of the readout signal V3 is greater than 850, the readout signal V3 is discarded. The value of the signal V1 and the flag "0" written to the memory cell 17A of the first memory region 16A corresponding to the pixel in the first scan operation remain unchanged.

In a fourth scan operation, if the value of a signal V4 read out from the pixel in the fourth scan operation is less than or equal to 850, the value of the signal V3 is overwritten to the bit string field for a pixel signal in the memory cell 17B of the second memory region 16B corresponding to the pixel. In addition, a flag "1" is overwritten to the bit string field for a flag. If the value of the readout signal V4 is greater than 850, the readout signal V4 is discarded. The value of the signal V2 and the flag "0" written to the memory cell 17B of the second memory region 16B corresponding to the pixel in the second scan operation remain unchanged.

In this way, in the solid-state image pickup device according to the third exemplary embodiment of the present invention, every time the scanning circuit 12 performs a readout (scan) operation, the scanning circuit 12 changes the sensitivity from low to high and reads out a signal from the pixel 20 n times (n=4 in this exemplary embodiment). Thus, n signals are obtained from the pixel 20. The write control circuit 15 performs control so that m (m=2 in this exemplary embodiment) signals out of the n signals obtained before the readout count becomes m are written to the memory circuit 16. Subsequently, if the value of the signal read out after the m signal values are written to the memory circuit 16 is less than or equal to a threshold value, the value of the signal is overwritten to the memory circuit 16 until the readout count reaches n. However, if the value of the signal read out after the m signal values are written to the memory circuit 16 is greater than the threshold value, the signal is discarded.

That is, in the first scan operation, the value of the signal V1 is written to the first memory region 16A. In the second scan operation, the value of the signal V2 is written to the second memory region 16B. In the third scan operation, if the value of the signal V3 is less than or equal to the threshold value, the value of the signal V3 is overwritten to the first memory region 16A. However, the value of the signal V3 is greater than the threshold value, the signal V3 is discarded. In the fourth scan operation, if the value of the signal V4 is less than or equal to the threshold value, the value of the signal V4 is overwritten to the second memory region 16B. However, the value of the signal V4 is greater than the threshold value, the signal V4 is discarded.

That is, the write control circuit 15 sequentially writes the value of the readout signal along with the flag to first to mth memory regions of the memory circuit 16 cyclically (i.e., 1, 2, ... m, 1, 2, ... m). At that time, if the value of the signal read out from the pixel 20 is greater than the threshold value (the adequate range), the write control circuit 15 discards that signal. That is, the readout scanning operation is performed n times (four times in this exemplary embodiment) by decreasing the time of exposure each time. After the pixel signal enters the linear range, m (m=1 in this exemplary embodiment) signal values are written to the memory circuit 16 together with flag information that indicates in which scan operation the signal value is read out. Accordingly, pixel signals are read out from each of the pixels 20 of the pixel array unit 11 through four scan operations performed by the scanning circuit 12. Thereafter the pixel signals can be stored in the memory circuit 16 having the first memory region 16A and the second memory region 16B (memory cells 17A and 17B) for two screens (one frame).

In this method, using the flag is not necessary in order to determine whether the signal output from a pixel is to be written to the memory circuit 16. Simply by using the determination result of the signal value performed by the determination circuits 14, it can be determined how to use the signal value. Accordingly, the determination circuit 14 need not read out the flag from the memory circuit 16. Consequently, the processing is simplified compared with that of the second exemplary embodiment.

Furthermore, in the memory cell 17A of the first memory region 16A, the signal value with a flag "0" represents a signal value read out during the first scan operation. The signal value with a flag "1" represents a signal value read out during the third scan operation. In the memory cell 17B of the second memory region 16B, the signal value with a flag "0" represents a signal value read out during the second scan operation. The signal value with a flag "1" represents a signal value read out during the fourth scan operation.

Accordingly, by reading out the signal value and the flag from each of the memory cells 17A and 17B of the first memory region 16A and the second memory region 16B of the memory circuit 16, the downstream signal processing circuit (e.g., a DSP circuit) can determine in which scan operation the signal value has been read out. Thereafter, the signal processing circuit can perform an image combining process to generate an image having an increased dynamic range by using the determination result. Therefore, the flexibility and the reliability of the image combining process can be increased.

Figure 6:
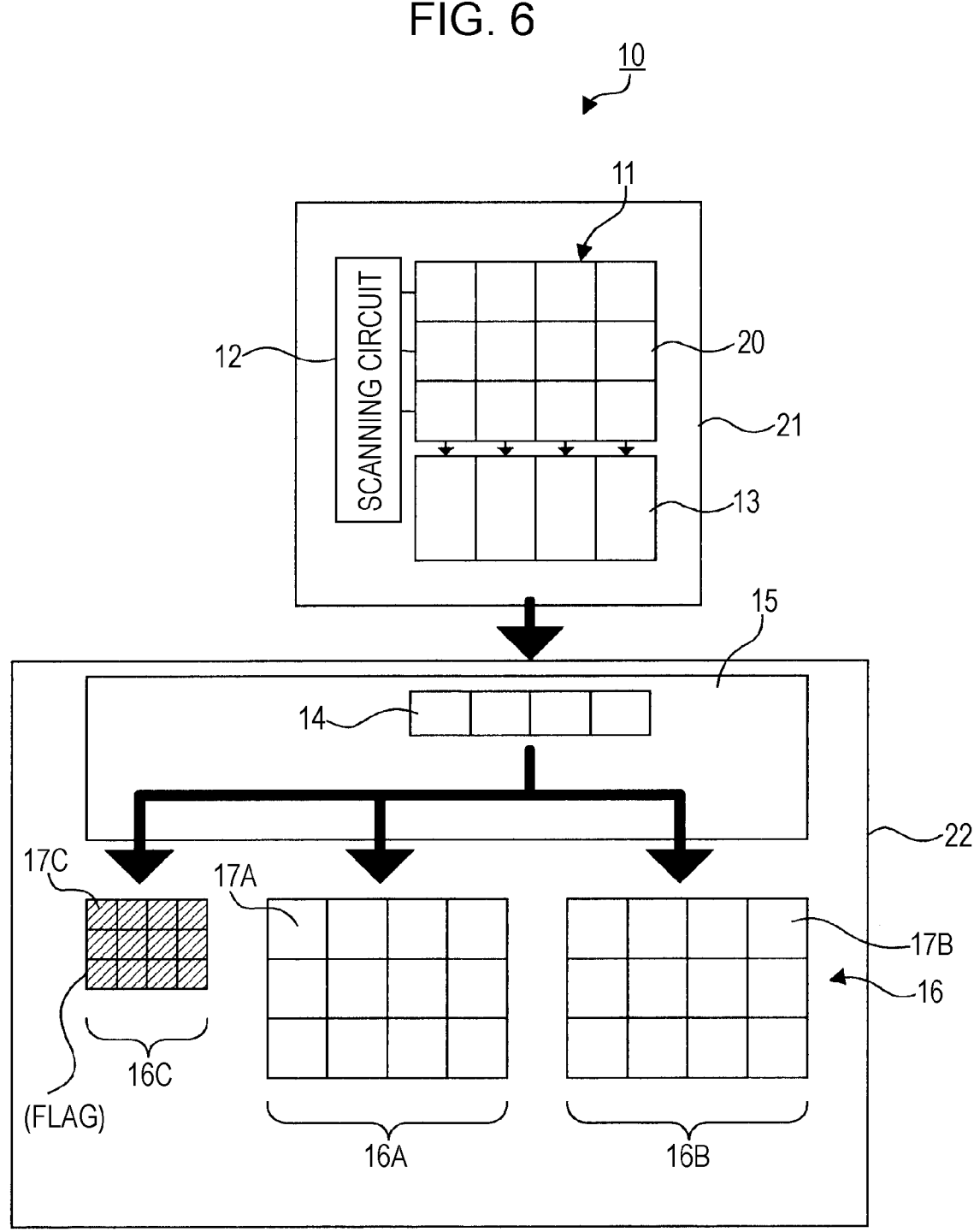
FIG. 6 illustrates an example of a different configuration of a memory circuit.

In the above-described embodiments, the signal value and the flag are written to the same memory cell of the memory circuit 16. However, the signal value and the flag may be written to different memory regions. For example, as shown in FIG. 4, the signal value and the flag are written to the memory cell 17A of the first memory region 16A. However, as shown in FIG. 6, in addition to the first memory region 16A and the second memory region 16B, a third memory region 16C may be provided so that memory cells 17C of the third memory region 16C correspond to the memory cells 17A of the first memory region 16A in a one-to-one correspondence fashion. Thereafter, the signal value may be written to the memory cell 17A of the first memory region 16A, and the flag may be written to the memory cell 17C of the third memory region 16C.

Furthermore, the memory circuit 16 may be a large-scaled memory circuit that includes a memory region exactly for one screen or two screens and an additional memory region used for a different purpose.

While the above-described embodiments have been described with reference to a memory segment (a segment to which the flag is assigned) corresponding to one pixel, the memory segment may correspond to a plurality of pixels, such as four pixels (e.g., four pixels in a color filter arrangement).

When the scanning circuit 12 drives the pixels of a row at the same time, it is desirable that the determination circuits 14 are provided so as to have a one-to-one correspondence with the pixels of columns. However, one determination circuit 14 may be shared by the pixels of a plurality of columns.

In addition, the signals output from the pixels may be directly written to the memory circuit 16. Alternatively, the signals output from the pixels may be subjected to some signal processing and may be written to the memory circuit 16.

When, like the above-described exemplary embodiments, one threshold value is applied to the determination circuits 14, one of a signal value greater than the threshold value, a signal value less than the threshold value, and a signal value greater than the threshold value can be stored in the memory circuit 16 in place of the signal value less than or equal to the threshold value. In addition, when a plurality of threshold values are applied to the determination circuits 14, only a signal value in a range determined by using these threshold values can be stored in the memory circuit 16. Furthermore, the threshold value may be changed during the operation. For example, the threshold value may be determined in the input section of the A/D conversion process such that if the gain is zero, the threshold value is set to 850/1024 of the input range of the A/D conversion and, if the gain of the A/D conversion is doubled, the threshold value is set to the input range.

While the above-described embodiments have been described with reference to a configuration in which the scanning circuit 12 reads out a signal from a pixel four times by changing the sensitivity (the time of exposure) each time and stores the one or two signals out of the four signals in the memory circuit 16, the above-described embodiments can be applied to all the cases where signals less than the readout signals are selected from among the readout signals and are stored in the memory circuit 16. That is, the scanning circuit 12 can read out signals from each of the pixels 20 in a row n times (where n is an integer greater than or equal to 2) by changing the sensitivity each time. In addition, the memory circuit 16 can include a memory region that can store at least m signals out of the n signals read out from the pixel 20 of the pixel array unit 11 by the scanning circuit 12, where m is an integer greater than or equal to 1 and is less than n.

Furthermore, while the above-described embodiments have been described with reference to a solid-state image pickup device as a physical quantity detection system that detects an externally supplied physical quantity, the above-described embodiments are applicable to a solid-state image pickup device that can manipulate either or both of a still image and a moving image. Still furthermore, application of the above-described embodiments is not limited to a solid-state image pickup device. For example, the above-described embodiments can be widely applied to a physical quantity detection system including a sensor in which pixels are two-dimensionally arranged in a matrix. Examples of the pixels include pixels for detecting the capacitance formed between a detection electrode and a finger in accordance with the irregularities of a fingerprint of the finger as physical quantities and pixels for detecting the distribution of electromagnetic waves or particles other than visible light, pressure, or chemicals as an externally supplied physical quantity.

The solid-state image pickup device 10 according to the above-described embodiments can be suitably used for an image pickup device (an image input device) in image pickup apparatuses, such as digital still cameras and video cameras.

Here, examples of the image pickup apparatus include a camera module and a camera system, such as a digital still camera and a video camera, including the camera module. The camera module includes an optical system that forms an image of a subject on an imaging plane (a light receiving surface) of a solid-state image pickup device serving as an imaging device and a signal processing circuit of the solid-state image pickup device. For example, the camera module is mounted in an electronic apparatus, such as a cell phone.

Figure 7:
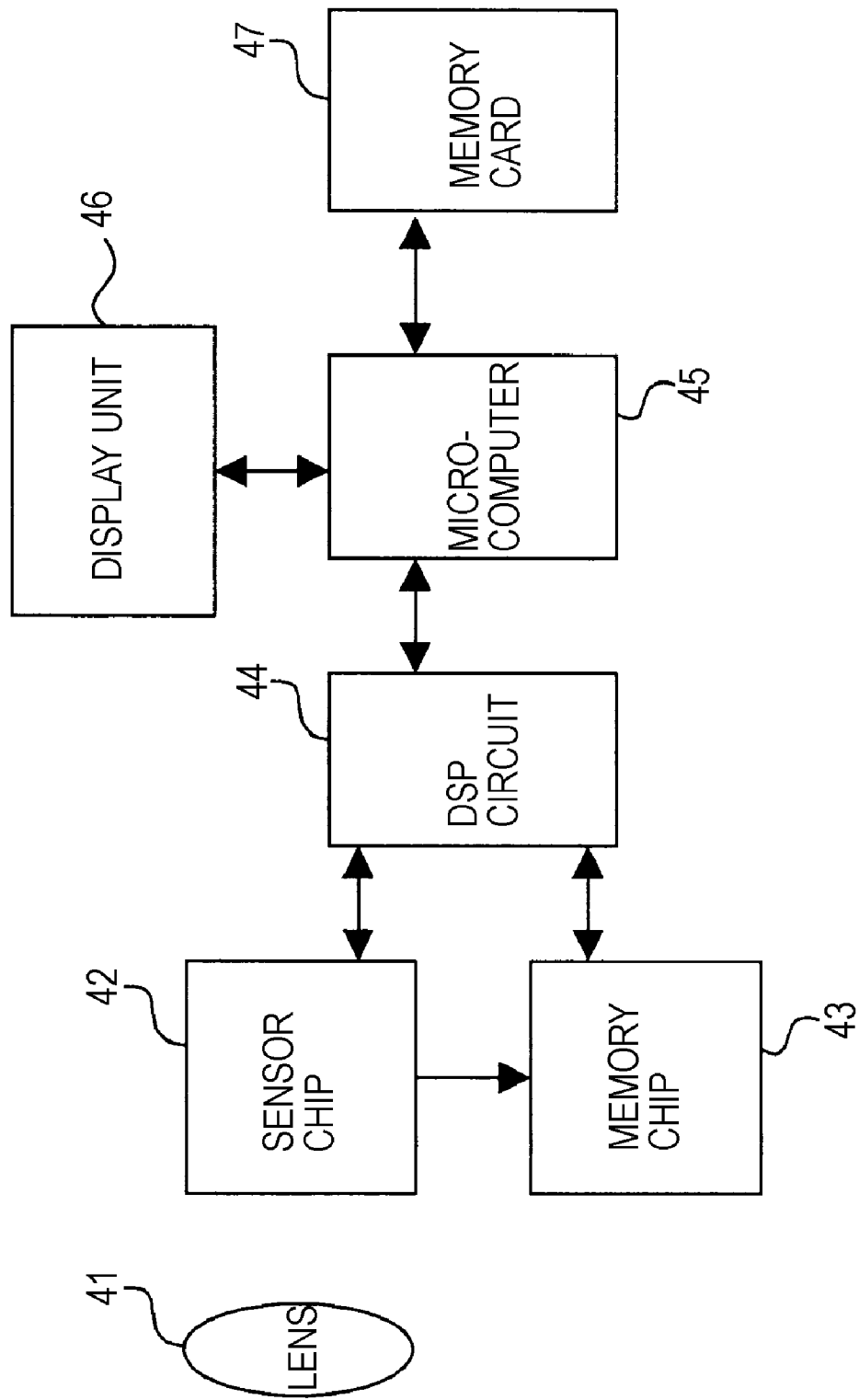
FIG. 7 is a block diagram of an example of an image pickup apparatus according to an exemplary embodiment of the present invention.

FIG. 7 is a block diagram of an example of an image pickup apparatus according to an exemplary embodiment of the present invention. According to this exemplary embodiment, an image pickup apparatus includes an optical system including a lens 41, a sensor chip 42 including a CMOS image sensor serving as an image pickup device (a solid-state image pickup device), a memory chip 43 including a frame memory (a memory circuit), a digital signal processor (DSP) circuit 44, a microcomputer 45 for processing an image signal output from the DSP circuit 44, a display unit 46 for displaying an image on the basis of the image signal, and a memory card 47 for storing the image signal.

The lens 41 leads imaging light emitted from a subject to an imaging plane of the image pickup device (a solid-state image pickup device), which is the CMOS image sensor. The optical system including the lens 41 serves as an imaging optical system. The CMOS image sensor converts the imaging light focused on the imaging plane thereof through the optical system including the lens 41 into an electrical signal on a pixel-by-pixel basis.

The sensor chip 42 includes the pixel array unit 11, the scanning circuit 12, and the column circuits 13. The memory chip 43 includes the determination circuits 14, the write control circuit 15, and the memory circuit 16. The DSP circuit 44 controls the sensor chip 42 and the memory chip 43. In addition, the DSP circuit 44 reads out a signal and a flag from the frame memory so as to generate a combined image having an increased dynamic range. The frame memory included in the memory chip 43 further has a memory region for storing an intermediate processing result computed by the DSP circuit 44.

In the image pickup apparatus having such a configuration, signals are readout from the CMOS image sensor included in the sensor chip 42 through a plurality of scan operations. Some of the signals (a number of signals less than the number of scan operations) are stored in the memory circuit 16 (the frame memory). Subsequently, the signals are read out and are combined by the DSP circuit 44 so that an image is formed.

As noted above, by using the solid-state image pickup device 10 according to the above-described embodiments as an image pickup device of an image pickup apparatus, such as a video camera, an electronic still camera, or a camera module of a portable device (e.g., a cell phone), the dynamic range can be increased even when a small-capacity memory is used.

It should be understood by those skilled in the art that various modifications, combinations, sub-combinations and alterations may occur depending on design requirements and other factors insofar as they are within the scope of the appended claims or the equivalents thereof.

What is claimed is:

1. A physical quantity detection system comprising:
    a pixel array unit including pixels two-dimensionally arranged in a matrix, each of the pixels converting an externally supplied physical quantity into an electrical signal;
    readout means for reading out a signal from each of the pixels n times, changing the sensitivity each time, where n is an integer greater than or equal to 3;
    storage means for storing m signals out of the n signals read out from the pixel, where m=2; and
    write control means for comparing the signal read out from the pixel by the readout means with a predetermined threshold value and controlling a write operation of the signal into the storage means on the basis of the comparison result.

2. The physical quantity detection system according to claim 1, wherein the readout means reads out a signal n times from one of the pixels of the pixel array unit by changing the sensitivity from high to low each time the readout operation is performed so as to obtain n signals, and wherein the write control means performs control so that the values of m signals out of the n signals obtained after the value of the readout signal becomes less than or equal to the threshold value are written to the storage means and the signals read out after the m signal values are written to the storage means are discarded.

3. The physical quantity detection system according to claim 1, wherein the readout means reads out a signal n times from one of the pixels of the pixel array unit by changing the sensitivity from low to high each time the readout operation is performed so as to obtain n signals, and wherein the write control means performs control so that the values of m signals out of the n signals obtained before the readout count reaches m are written to the storage means and, subsequently, if the values of the signals obtained before the readout count reaches n are less than or equal to the threshold value, the values of the signals are overwritten to the storage means and, if the values of the signals obtained before the readout count reaches n are greater than the threshold value, the signals are discarded.

4. The physical quantity detection system according to claim 1, wherein, upon writing the signal value into the storage means, the write control means causes the storage means to store the signal value along with identification information indicating in which one of the n readout operations the signal value was read out.

5. The physical quantity detection system according to claim 4, wherein the write control means controls the write operation of the signal value by referencing the identification information stored in the storage means.

6. A method for driving a physical quantity detection system, the physical quantity detection system including a pixel array unit having pixels two-dimensionally arranged in a matrix, each of the pixels converting an externally supplied physical quantity into an electrical signal, the method comprising the steps of:
    reading out a signal from each of the pixels n times, changing the sensitivity each time, where n is an integer greater than or equal to 3; and
    comparing the signals read out from the pixel by the readout means with a predetermined threshold value and controlling, on the basis of the comparison result, a write operation of the signals into storage means capable of storing m signals out of the n signals read out from the pixel, where m=2.

7. A solid-state image pickup device comprising:
    a pixel array unit including pixels two-dimensionally arranged in a matrix, each of the pixels converting external incident light into an electrical signal;
    readout means for reading out a signal from each of the pixels n times, changing the sensitivity each time, where n is an integer greater than or equal to 3;
    storage means for storing m signals out of the n signals read out from the pixel, where m=2; and
    write control means for comparing the signal read out from the pixel by the readout means with a predetermined threshold value and controlling a write operation of the signal into the storage means on the basis of the comparison result.

8. A method for driving a solid-state image pickup device, the solid-state image pickup device including a pixel array unit having pixels two-dimensionally arranged in a matrix, each of the pixels converting external incident light into an electrical signal, the method comprising the steps of:
    reading out a signal from each of the pixels n times, changing the sensitivity each time, where n is an integer greater than or equal to 3; and comparing the signal read out from the pixel by the readout means with a predetermined threshold value and controlling, on the basis of the comparison result, a write operation of the signal into storage means capable of storing m signals out of the n signals read out from the pixel, where m=2.

9. An image pickup apparatus comprising:

a solid-state image pickup device including a pixel array unit having pixels two-dimensionally arranged in a matrix, each of the pixels including a photoelectric transducer for converting external incident light into signal charge, readout means for reading out a signal from each of the pixels n times, changing the sensitivity each time, where n is an integer greater than or equal to 3, storage means for storing m signals out of the n signals read out from the pixel, where m=2, and write control means for comparing the signal read out from the pixel by the readout means with a predetermined threshold value and controlling a write operation of the signal into the storage means on the basis of the comparison result; and an optical system for leading light incident from a subject to an imaging plane of the solid-state image pickup device.

10. A physical quantity detection system comprising:

a pixel array unit including pixels two-dimensionally arranged in a matrix, each of the pixels converting an externally supplied physical quantity into an electrical signal;

a readout unit configured to read out a signal from each of the pixels n times, changing the sensitivity each time, where n is an integer greater than or equal to 3;

a storage unit configured to store m signals out of the n signals read out from the pixel, where m=2; and a write control unit configured to compare the signal read out from the pixel by the readout unit with a predetermined threshold value and configured to control a write operation of the signal into the storage unit on the basis of the comparison result.

11. A solid-state image pickup device comprising:

a pixel array unit including pixels two-dimensionally arranged in a matrix, each of the pixels converting external incident light into an electrical signal;

a readout unit configured to read out a signal from each of the pixels n times, changing the sensitivity each time, where n is an integer greater than or equal to 3;

a storage unit configured to store m signals out of the n signals read out from the pixel, where m=2; and a write control unit configured to compare the signal read out from the pixel by the readout unit with a predetermined threshold value and configured to control a write operation of the signal into the storage unit on the basis of the comparison result.

12. An image pickup apparatus comprising:

a solid-state image pickup device including a pixel array unit having pixels two-dimensionally arranged in a matrix, each of the pixels including a photoelectric transducer configured to convert external incident light into signal charge;

a readout unit configured to read out a signal from each of the pixels n times, changing the sensitivity each time, where n is an integer greater than or equal to 3, a storage unit configured to store m signals out of the n signals read out from the pixel, where m=2; and a write control unit configured to compare the signal read out from the pixel by the readout unit with a predetermined threshold value and configured to control a write operation of the signal into the storage unit on the basis of the comparison result; and an optical system for leading light incident from a subject to an imaging plane of the solid-state image pickup device.

* * * * *